United States Patent [19]

Morehouse

[11] 4,165,653
[45] Aug. 28, 1979

[54] SIGNAL RATIO INDICATOR

[75] Inventor: Thomas P. Morehouse, Amherst, N.H.

[73] Assignee: McGraw-Edison Company, Elgin, Ill.

[21] Appl. No.: 928,623

[22] Filed: Jul. 27, 1978

[51] Int. Cl.² .............................................. G01L 9/10
[52] U.S. Cl. ...................................... 73/722; 73/708; 324/59; 324/98; 336/30
[58] Field of Search ................. 73/722, 728, 745, 708; 336/30; 324/59, 98

[56] References Cited

U.S. PATENT DOCUMENTS

| | | | |
|---|---|---|---|
| 3,308,411 | 3/1967 | Roshala | 73/722 |
| 3,727,463 | 4/1973 | Intraub | 73/722 |
| 3,757,241 | 9/1973 | Kime et al. | 330/30 D |
| 3,780,587 | 12/1973 | Rivere | 73/753 |
| 3,826,969 | 7/1974 | Eichelberger et al. | 323/19 |

*Primary Examiner*—Donald O. Woodiel
*Attorney, Agent, or Firm*—Thomas E. McDonald; Jon C. Gealow; Ronald J. LaPorte

[57] ABSTRACT

A pressure measuring system which includes a variable reluctance pressure transducer energized from an alternating voltage source, wherein the ratio of the output voltage to the source voltage is proportional to the pressure being sensed. Precision full wave rectifiers convert the source and output voltages to reference and sensing direct voltage signals, respectively. A switching regulator regulates the higher amplitude reference voltage signal to have exactly the same average voltage as the sensing voltage signal. The switching regulator also regulates a constant voltage DC signal from a regulated power supply at the same switching duty cycle as the regulated reference voltage signal, to produce a direct voltage, pressure-sensing signal which is uneffected by voltage fluctuations in the alternating voltage source for the pressure transducer. After the DC offset corresponding to the lowest pressure difference to be measured is removed, this direct voltage, pressure-sensing signal is converted to a direct current signal to drive a DC ammeter, calibrated in units of pressure, which is connected to an unregulated DC power supply.

3 Claims, 6 Drawing Figures

U.S. Patent    Aug. 28, 1979    Sheet 1 of 3    4,165,653
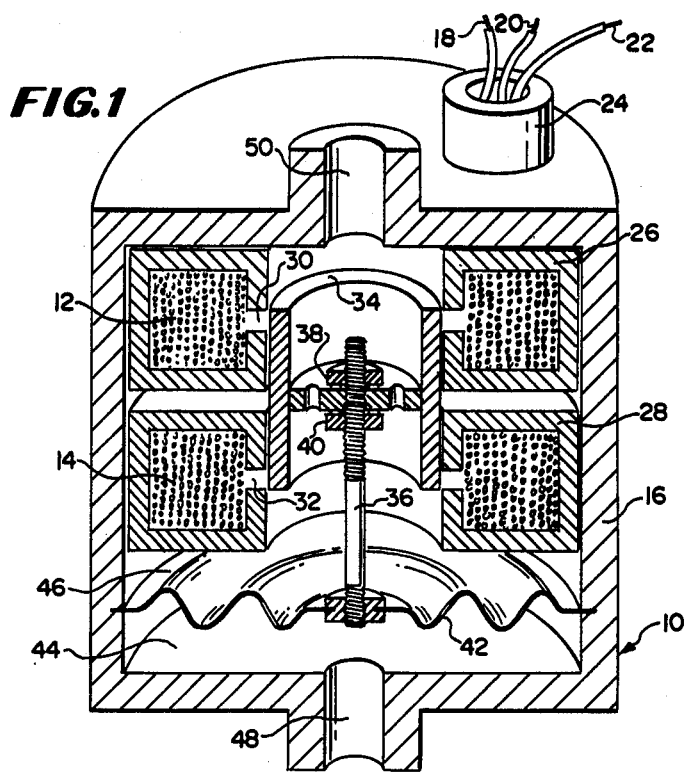
FIG. 1
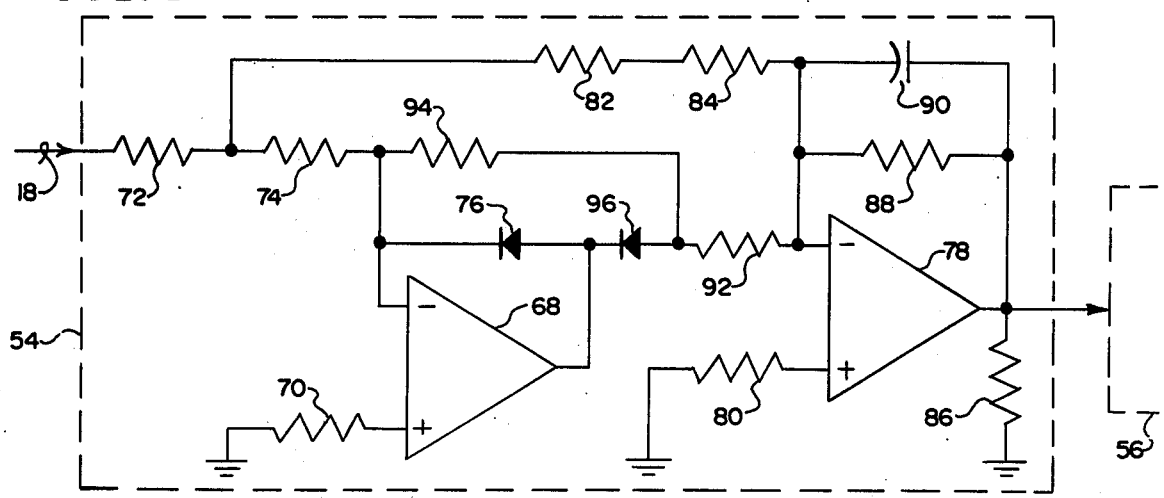
FIG. 3
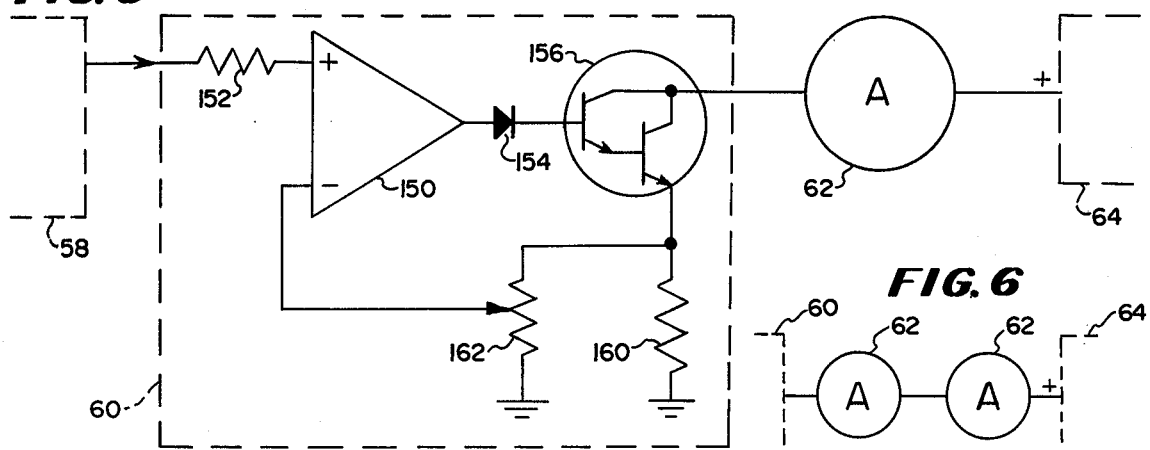
FIG. 5
FIG. 6

SIGNAL RATIO INDICATOR

BACKGROUND OF THE INVENTION

1. Field of the Invention

The invention relates generally to the measurement of the ratio between two electrical signals. More particularly, it relates to an indicator circuit for measuring a parameter sensed by an electrical transducer, having an electrical output signal whose ratio to an electrical input signal to the transducer is proportional to the parameter being sensed.

2. Prior Art

Variable reluctance pressure transducers, such as described in U.S. Pat. No. 3,308,411, to J. L. Roshala, issued Mar. 7, 1967, are used extensively in aircraft for sensing differential pressures of various fluids such as engine and transmission oil, fuel, bleed air and freon. Typically, these transducers include two, identical, adjacent, series-connected induction coils disposed along a common axis, which are connected in parallel with a center-tapped stationary coil in a moving coil, dynamometer type indicator across an alternating voltage supply to form an AC bridge. The moving coil of the indicator is connected between the common terminal of the series connected induction coils and the center tap of the indicator stationary coil to serve as the detector or galvanometer leg of the bridge circuit. The differential pressure to be measured is sensed by a flexible diaphragm having opposite sides acted upon by the two pressures. A magnetic armature carried by this diaphragm is slidably disposed within the series connected induction coils for axial movement therein. The relative values in the two series connected transducer induction coils are determined by the axial position of the magnetic armature. Thus, any change in the differential pressure being sensed by the diaphragm causes a corresponding change in the position of the diaphragm and the magnetic armature attached to it. This action changes the relative inductance values of the series connected induction coils, which unbalances the bridge circuit and changes the current flow in the moving coil of the indicator. This moving coil then rebalances the circuit by moving to new angular position, thereby indicating the differential pressure acting on the diaphragm of the transducer. The indicator also includes at least one hair spring which serves to return the pointer to zero in the event of a power failure.

Since this indicator is a null type instrument, any torque exerted by hair springs to return the pointer to its zero position will cause the indicator to be biased down scale. Consequently, these hair springs must be designed to produce a very small restoring force on the indicator pointer, so that the down scale biasing effect of these springs is small and does not substantially effect the indicator accuracy. The use of these delicate hair springs limits the magnitude of vibration that this indicator can withstand. For example, this type of indicator is not rugged enough to perform satisfactorily in the high vibration environment of helicopters.

Also, since a change in the impedance of any circuit element in this measuring bridge circuit will affect the current flowing in the other elements of the bridge, only one of these null-type indicators can be used with each pressure transducer. When two of these indicators are connected in parallel to operate with the same pressure transducer, there is an interaction between them such that these two indicators do not necessarily indicate the same pressure nor are the readings repeatable. For example, physically moving the pointer on one indicator can cause a change in indication on the other indicator.

SUMMARY OF THE INVENTION

Therefore, it is a primary object of the invention to provide an indicator circuit for accurately measuring the magnitude ratio of a first electrical signal to a second electrical signal of higher magnitude.

It is another object of the invention to provide an indicator circuit for accurately measuring a parameter sensed by an electrical transducer, which is energized from an electrical source voltage, and which produces an output voltage whose magnitude, relative to the magnitude of the source voltage, is proportional to the sensed parameter, and in which the indicator circuit measuring accuracy is unaffected by amplitude changes or fluctuations of the source voltage.

It is a further object of the invention to provide a pressure measuring system in which a plurality of permanent-magnet, moving-coil, DC ammeters, calibrated in units of pressure, can be used with a single, conventional, variable-reluctance pressure transducer to indicate a pressure sensed by the transducer.

It is yet another object of the invention to provide an accurate pressure measuring system for use in a high vibration environment.

In the preferred embodiment of this invention, an unregulated alternating voltage is rectified and filtered to provide unregulated, positive and negative DC voltages. The unregulated positive voltage is supplied to a voltage regulator providing a positive, constant voltage output. Similarly, the unregulated negative voltage is supplied to another voltage regulator providing a negative, constant voltage output. Also the unregulated alternating voltage is supplied to a first precision full wave rectifier circuit, where it is rectified, scaled, and filtered to produce a first direct voltage signal, hereinafter referred to as the reference voltage signal.

Two series-connected coils of a conventional, variable reluctance, pressure transducer which is arranged to sense a differential fluid pressure, are connected across the unregulated alternating voltage source. The voltage signal appearing at the common connection of these transducer induction coils is supplied to the input of a second precision full wave rectifier circuit, which rectifies, scales, and filters the voltage signal to produce a second direct voltage signal, hereinafter referred to as the sensing voltage signal.

The reference voltage signal is connected through a first switching element to a signal filtering means, including a resistor-capacitor network, which smoothes the switched reference voltage signal from the first switching element as it is supplied to a first input of a comparator. The other input of the comparator is connected to receive the sensing voltage signal. The output of the comparator is connected to be switched between the regulated, positive voltage supply and the regulated, negative voltage supply. The output of the comparator is connected to the first switching element and to a second, identical switching element to simultaneously switch these elements on and off, depending on the amplitude of the switched referenced voltage signal relative to the sensing voltage signal. This second switching element is connected in series with another signal filtering means, including a resistor-capacitor network, across one of the regulated direct voltage supplies. A resistive feedback circuit between the output and the second input of the comparator is used to provide hysteresis for the switching cycle of the comparator. When the system is initially energized, the two switching elements will be turned on and rendered conductive, to initiate charging of the capacitors connected behind these switching elements. When the amplitude of the switched reference voltage signal at the first input of the comparator rises to a value which exceeds the sensing voltage signal at the second input of the comparator by a predetermined increment, the output of the comparator will switch, to turn off both switching elements. When the switched reference voltage signal at the first input of the comparator drops to a value which is below the value of the sensing voltage signal at the second input of the comparator by the same predetermined increment, the output of the comparator will switch to again turn on both switching elements. In this way, the first switching element regulates the reference voltage signal so that the average value of the switched reference voltage signal applied to the first input of the comparator exactly equals the average value of the sensing voltage signal applied to the second input of the comparator.

Thus, the duty cycle of these two switching elements will be equal to the magnitude ratio of the sensing voltage signal to the reference voltage signal. Any increase or decrease in the unregulated alternating voltage source will change the switching rate of these two switching elements, but will not effect their duty cycle. Also, since the regulated direct voltage signal switched by the second switching element is maintained at a constant voltage level, the average value of the switched, regulated voltage signal across the resistor-capacitor network in series with the second switching element will be directly proportional to the differential fluid pressure sensed by the pressure transducer. This direct voltage pressure-sensing signal is scaled, the offset corresponding to the lowest sensed differential pressure is removed, and the signal is converted to a direct current signal by known electronic circuitry to drive a conventional DC ammeter calibrated in units of pressure.

BRIEF DESCRIPTION OF THE DRAWINGS

Further objects of the present invention will become more apparent to those skilled in the art from the following more detailed description and study of the appended drawings herein:

FIG. 1 is a simplified, perspective, cross-sectional view of a known type variable reluctance pressure transducer;

FIG. 3 is a schematic diagram of a sensing signal precision rectifier circuit for the embodiment of FIG. 2;

FIG. 5 is a schematic diagram of a direct voltage-to-direct current signal converter circuit for the embodiment of FIG. 2; and FIG. 6 is a schematic diagram depicting a variation in the circuit of FIG. 5.

DESCRIPTION OF A PREFERRED EMBODIMENT

Figure 2:
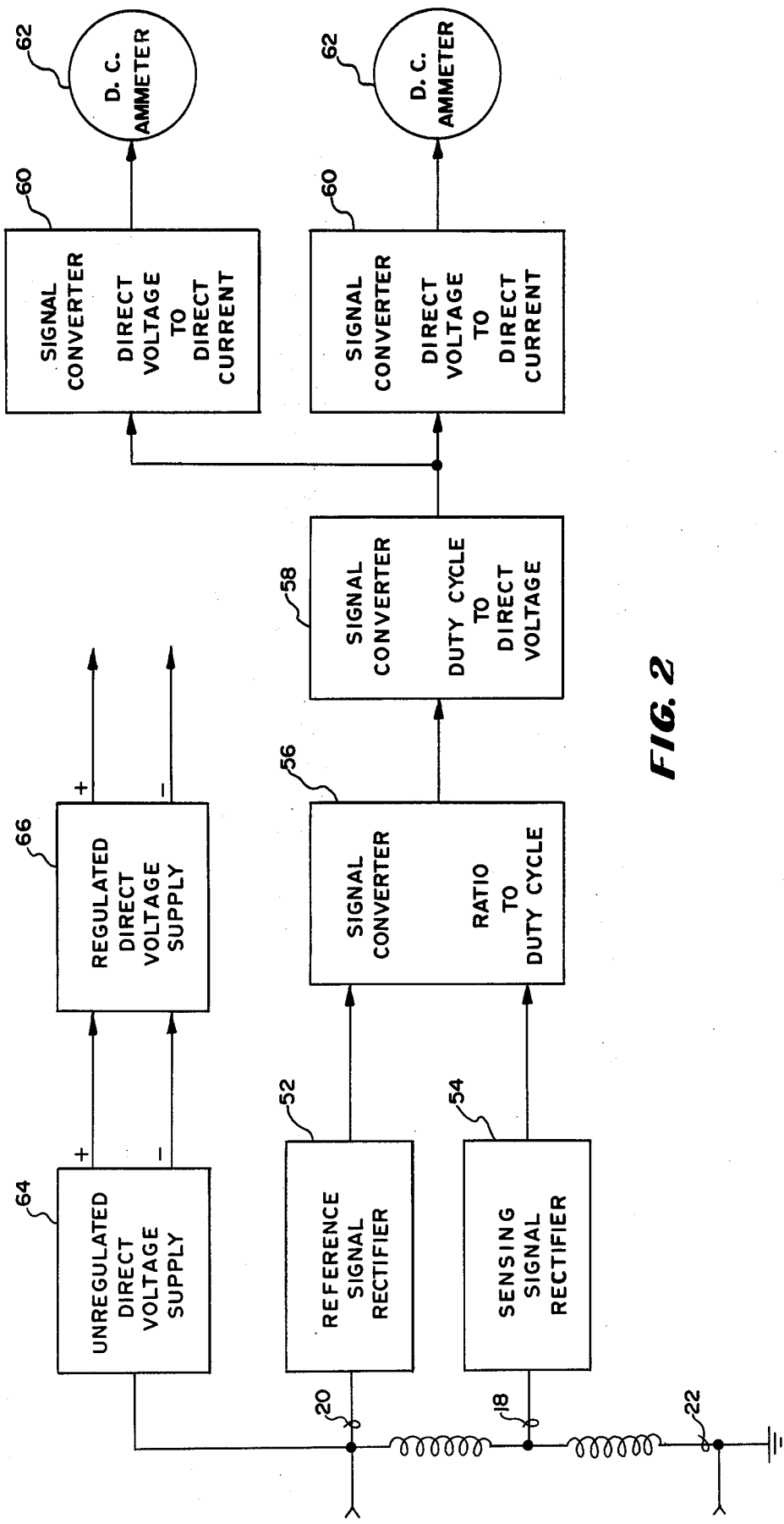
FIG. 2 is a schematic block diagram of a preferred embodiment of the invention.

In the variable reluctance pressure transducer 10 shown in FIG. 1, two identical series-connected induction coils 12 and 14, are disposed along a common axis within an enclosure 16. The common terminal of the coils 12, 14 is connected to a tap lead 18, the end terminal of the coil 12 is connected to a phase lead 20, and the end terminal of the coil 14 is connected to a ground lead 22. These phase, tap, and ground leads 20, 18, 22, are brought out of the enclosure 16 through a sealed electrical conduit 24 at one end of the enclosure 16. The phase and ground leads 20, 22 are connected across a single phase, grounded electric power source to apply an alternating voltage to the coils 12, 14. Coils 12 and 14, are enclosed within casings 26, 28 respectively, formed of magnetic material which provide magnetic flux paths about the coils 12 and 14 and define air gaps 30 and 32 adjacent the inner peripheries of the coils 12 and 14 respectively.

A cylindrical armature 34 of magnetic material is disposed within a bore formed by the casings 26, 28 for movement along the common axis of the two coils 12, 14. The magnetic armature 34 is secured to one end of a threaded shaft 36 by a pair of positioning nuts 38, 40. The opposite end of shaft 36 is attached to the center of a flexible diaphragm 42 which separates, and helps define, two compartments 44, 46, within the enclosure 16. One end of the enclosure 16 defines an opening 48 for admitting fluid to the compartment 44, and the opposite end of the enclosure 16 defines another opening 50 for admitting fluid to the compartment 46.

When the magnetic armature 34 is positioned to shunt an equal portion of each of the air gaps 30, 32, as shown in FIG. 1, both of the coils 12, 14, will have the same magnetic reluctance, and the voltage on tap lead 18 will be equal to half the voltage on phase lead 20. If the fluid pressure within the compartment 44 is increased, or the fluid pressure within the compartment 46 decreased, the diaphragm 42 will be deflected away from the opening 48 to move the armature 34 upward. This upward movement of the armature 34 simultaneously reduces the effective air gap in the magnetic circuit of the upper coil 12 and increases the effective air gap in the magnetic circuit of the lower coil 14, thus changing the voltage on tap lead 18 in one direction. If, on the other hand, the fluid pressure within the compartment 46 is increased or the fluid pressure within the compartment 44 decreased, the diaphragm 42 will be deflected to move the armature 34 downward. This downward movement of the armature simultaneously decreases the effective air gap in the magnetic circuit 28 of the lower coil 14 and increases the effective air gap in the magnetic circuit of the upper coil 12, thus changing the voltage on tap lead 18 in an opposite direction.

In a typical variable reluctance pressure transducer designed for use on aircraft with a 26 volt 400 hertz power supply, such as the Edison Model 418 pressure transmitter, manufactured by the McGraw-Edison Company, Edison Electronics Division, the ratio of the tap voltage to the applied voltage will vary between 0.6 and 0.4 for the respective minimum and maximum pressures sensed by the transducer.

Referring now to FIG. 2, the induction coils 12, 14, of the pressure transducer shown in FIG. 1 are connected in series across an unregulated 26 volt, 400 hertz aircraft power supply. The opening 48 of the pressure transducer 10 is connected to a source of pressurized fluid, and the opening 50 is open to the surrounding atmosphere, so that the ratio of the voltage on tap lead 18 to the voltage on phase lead 20 will be high at zero sensed pressure and low at the maximum sensed pressure corresponding to the full scale reading of the indicator. The various circuits shown in block form in FIG. 2, are described hereinafter in further detail in conjunction with FIGS. 3–7.

The applied voltage is rectified, scaled, and filtered in a reference signal rectifier circuit 52, to produce a DC reference signal proportional to the applied voltage. Similarly, the center tap voltage is rectified, filtered, and scaled in a sensing signal rectifier circuit 54 to produce a direct voltage sensing signal. The reference signal and the sensing signal are compared in a ratio-to-duty cycle signal converter 56, which produces a pulsed DC signal which has a duty cycle proportional to the ratio of the sensing signal to the reference signal. This pulsed, DC signal is supplied to a duty cycle-to-direct voltage signal converter 58, which converts the pulsed, DC signal into a continuous direct voltage signal having an average magnitude proportional to the duty cycle of the pulsed direct voltage signal, and hence proportional to the pressure sensed by the pressure transducer 10. The continuous direct voltage pressure sensing signal is converted into a direct current signal proportional to the pressure sensed by the pressure transducer 10 by a voltage-to-current signal converter 60 and the direct current signal is used to drive the moving coil element of a standard D'Arsendal type DC ammeter 62, which is calibrated in units of pressure.

If desired, a plurality of voltage-to-current signal converters 60, each driving a separate DC ammeter 62, may each be connected to receive the continuous direct voltage pressure sensing signal from the duty cycle-to-direct voltage signal converter 58. Thus, the two DC ammeters 62 shown in FIG. 2 each independently indicate the pressure sensed by the pressure transducer 10.

The unregulated alternating voltage signal is also rectified and filtered in an unregulated direct voltage supply circuit 64 to produce an unregulated, negative direct voltage and an unregulated positive direct voltage. These unregulated positive and negative direct voltages are supplied to a regulated direct voltage supply circuit 66, having a positive constant voltage output and a negative constant voltage output, which are supplied to the signal converters 56, 58, as described hereinafter.

The sensing signal precision rectifier circuit 54 shown in FIG. 3 includes a first operational amplifier 68, having its non-inverting input connected through a resistor 70 to ground, and its inverting input connected to the common terminal lead 18 of the variable reluctance pressure transducer 10 through two series-connected resistors 72, 74 of equal ohmic value. A diode 76 is connected between the output of the amplifier 68 and its inverting input, to conduct current when the voltage of the amplifier output is positive with respect to the voltage at its inverting input. A second operational amplifier 78 has its non-inverting input connected through a resistor 80 to ground, its inverting input connected through two series-connected resistors 82, 84, each having the same ohmic value as the resistor 74, to the junction of the resistors 72, 74, and its output connected to ground through a resistor 86. A feedback resistor 88, and a capacitor 90 are connected in parallel between the output and the inverting input of the amplifier 78. The inverting input of the amplifier 78 is connected to the output of the amplifier 68 through a resistor 92, having the same ohmic value as the resistor 74, and a diode 96 which conducts current when the voltage at the output of the amplifier 68 is negative. A resistor 94, having the same ohmic value as the resistor 74, is connected between the inverting input of the amplifier 68 and the junction of the resistor 92 and the diode 96.

When the signal supplied to the inverting input of the amplifier 68 is positive, the diode 76 is reversely biased, and the resistor 94 and the diode 96 define a feedback path for the amplifier 68. When the signal supplied to the inverting input of the amplifier 68 is negative, the diode 96 is reversely biased to disconnect the resistor 94 as a feedback resistor of the amplifier 68, and the diode 76 conducts to serve as a low impedance feedback path for the amplifier 68.

Thus, the amplifier 68 operates as a half-wave rectifier with a gain of minus one for positive inputs and a gain of zero for negative inputs. The amplifier 78 operates as a summing amplifier, to sum the output of the amplifier 68 with one-half the input to the amplifier 68 at the inverting input of the amplifier 78, so that the input to the amplifier 78 is always a negative signal having a magnitude of one-half the alternating input signal to the amplifier 68. This negative input signal is inverted and scaled in the amplifier 78, so that the output signal of the amplifier 78 is positive for either the positive or negative portions of the alternating signal from the pressure transducer 10. The ohmic value of the resistor 88, relative to the ohmic value of the input resistors to the amplifier 78, will determine the gain of the amplifier 78 and, with the amplifier 68, the complete transfer function of the sensing signal rectifier 54, that is, the ratio of the average direct voltage sensing signal output to the rms alternating voltage input to the sensing signal rectifier 54. The capacitor 90 filters the output signal of the amplifier 78 to produce a smooth, direct voltage sensing signal.

The same basic circuit shown in FIG. 3 for the sensing signal rectifier 54 can also be used as a circuit for the reference signal rectifier 52 to convert the unregulated alternating voltage applied to the pressure transducer 10 to a smooth, direct voltage, reference signal, although different ohmic values may be selected for the resistor elements, such as the resistor corresponding to the feedback resistor 88, when different transfer functions for the two rectifier circuits 52, 54 are required.

Figure 4:
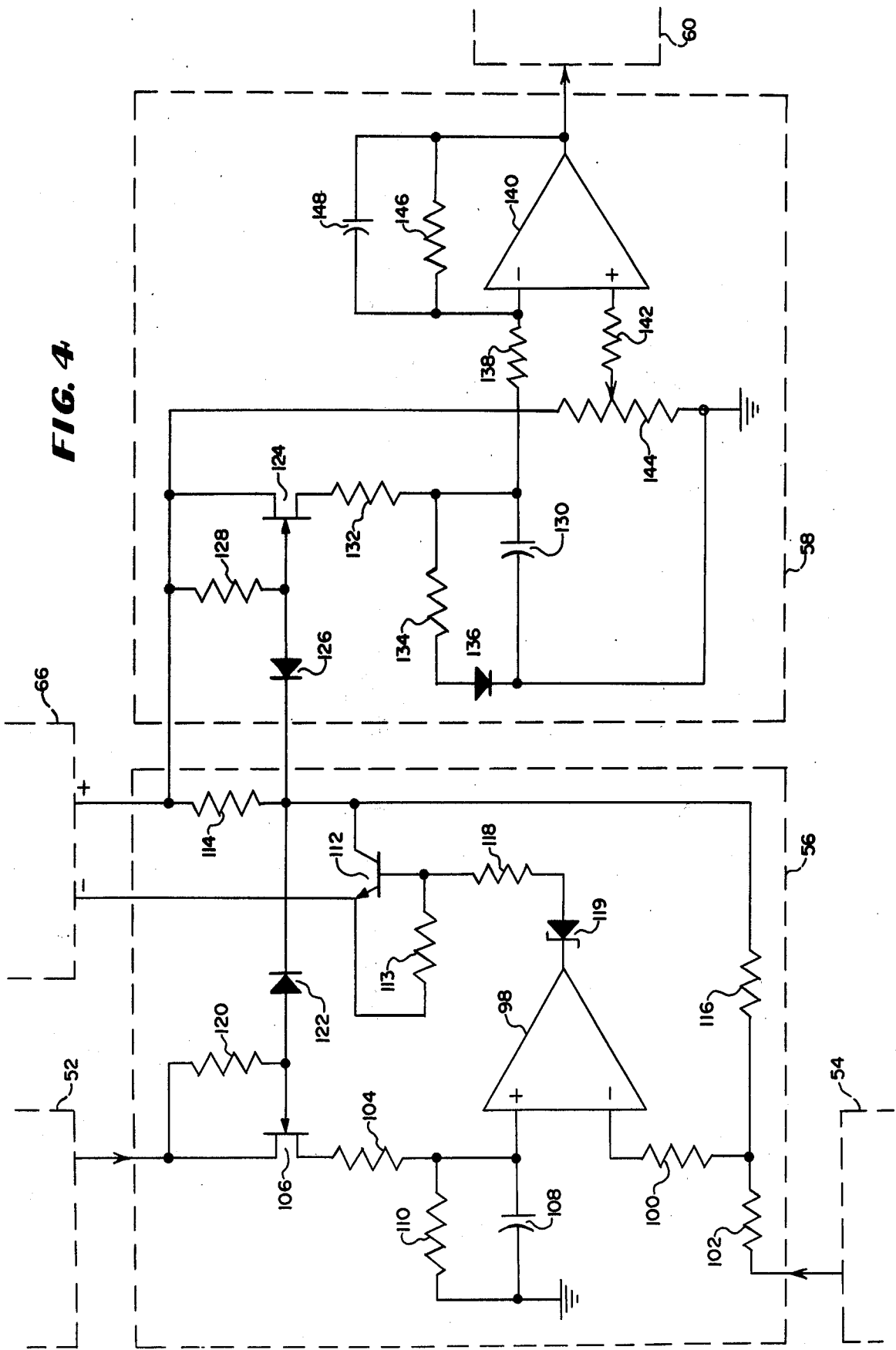
FIG. 4 is a schematic diagram of a ratio-to-duty cycle signal converter circuit and a duty cycle-to-direct voltage signal converter circuit for the embodiment of FIG. 2.

The ratio-to-duty cycle signal converter 56, shown in FIG. 4, includes an operational amplifier 98 having an inverting input connected to receive the direct voltage sensing signal from the sensing signal rectifier 54 through two series-connected resistors 100, 102. The non-inverting input of this amplifier 98 is connected to receive the direct voltage reference signal from the reference signal rectifer 52 through a resistor 104 and a field effect transistor switch 106 connected in series with this resistor 104. A capacitor 108, is connected in parallel with a resistor 110 between the non-inverting input of the amplifier 98 and ground. The collector of an NPN transistor 112 is connected through a resistor 114 to the positive voltage output of the regulated direct voltage supply 66. The emitter of the transistor 112 is connected to the negative voltage output of the regulated direct voltage supply 66. A resistor 113 is connected between the emitter and base of the transistor 112. The collector of this transistor 112 is connected through a resistor 116 to the junction of the resistors 100 and 102. The base of the transistor 112 is connected through a resistor 118 and a zener diode 119 to the output of the amplifier 98. One end of a resistor 120 is connected to receive the direct reference signal from the reference signal rectifier 52. The other end of this resistor 120 is connected to the gate of the field effect transistor switch 106 and also through a rectifier 122 to the collector of the transistor 112, to allow current to flow through this resistor 120 towards the collector of the transistor 112.

The direct voltage reference signal from the reference signal rectifier 52 is applied through the field effect transistor switch 106 to a signal filter network consisting of the resistors 104, 110 and the capacitor 108. The filter voltage signal across the capacitor 108 is applied to the non-inverting input of the amplifier 98, which operates as a comparator with hysteresis. When the voltage across the capacitor 108 is greater than the direct voltage sensing signal applied to the inverting input of the comparator amplifier 98, the output of the comparator amplifier 98 is switched to a positive potential and applied to the base of the transistor 112 to turn on this transistor. When the transistor 112 turns on, the gate of the field effect transistor switch 106 is connected through the diode 122 and through the collector-to-emitter junction of the transistor 112 to the negative voltage output of the regulated direct voltage supply 66, and the field effect transistor switch 106 is turned off. This allows the capacitor 108 to discharge through the resistor 110. When the voltage across the capacitor 108 falls below the reference signal applied to the inverting input of the comparator amplifier 98, the output of the comparator amplifier 98 goes negative, turning off the transistor 112. The field effect transistor switch 106 is now turned on through the resistor 120 and again starts to charge the capacitor 108.

Hysteresis for the switching operation of the comparator amplifier 98 is provided by the resistor 116, so that the capacitor 108 will charge and discharge between a predetermined voltage above, and the same predetermined voltage below, the sensing signal output from the rectifier circuit 54. The respective transfer functions of the reference signal rectifier 52 and the sensing signal rectifier 54, and the values of the capacitor 108 and resistors 110, 116 determine the switching cycle frequency range of the field effect transistor switch 106. The duty cycle of the field effect transistor switch 106, that is, the proportional part of each switching cycle that the field effect transistor switch 106 will be turned on, will be proportional to the ratio of the sensing voltage signal to the referenced voltage signal. The voltage at the collector of the transistor 112, which is switched between the positive and negative voltage outputs of the regulated direct voltage supply 66 to turn on or off the field effect transistor switch 106, will also include this duty-cycle information, so that the proportion of each switching cycle that the collector voltage of the transistor 112 is positive will be equal to the ratio of the sensing direct voltage signal to the reference direct voltage signal.

In the duty cycle-to-direct voltage signal converter circuit 58, the gate of a field effect transistor switch 124, which is identical to the field effect transistor switch 106, is connected through a diode 126 to the collector of the transistor 112, in the same manner as is the gate of the field effect transistor switch 106. The gate of the field effect transistor switch 124 is also connected through a resistor 128 to the positive constant voltage output of the regulated direct voltage supply 66. One side of a signal filtering capacitor 130 is connected through a resistor 132 and the field effect transistor switch 124, to the positive constant voltage output of the regulated direct voltage supply 66. The opposite side of this capacitor 130 is connected to ground. A temperature-compensated capacitor discharge circuit, consisting of a resistor 134 connected in series with a diode 136, is connected across the capacitor 130.

When the transistor 112 turns on, the gate of the field effect transistor switch 124 is connected through the diode 126 and through the collector-to-emitter junction of the transistor 112 to the negative voltage output of the regulated direct voltage supply 66, and the field effect transistor switch 124 is turned off at the same time as the field effect transistor switch 106 is turned off.

When the transistor 112 turns off, the field effect transistor switch 124 is turned on through the resistor 128 at the same time as the field effect transistor switch 106 is turned on.

Since both field effect transistor switches 106, 124 are simultaneously turned on or off by the switched positive or negative voltage signals appearing at the collector of the transistor 112, the ratio of the average positive voltage of the capacitor 130 to the positive voltage output of the regulated voltage supply 66 will be exactly equal to the ratio of the average positive voltage of the capacitor 108 to the average value of the positive voltage output of the reference signal rectifier circuit 52. Also, since the positive voltage output of the regulator voltage supply 66 is maintained at a constant level, the average positive voltage charge on the capacitor 130 will be proportional to the ratio of the alternating voltage on tap 18 of the pressure transducer 10 to the unregulated alternating voltage applied across the two series-connected induction coils 12, 14 of the pressure transducer 10. Since the voltage on tap 18 of the pressure transducer 10 varies inversely with the pressure sensed by the transducer 10, the average value of the positive voltage across the capacitor 130 will be inversely proportional to the pressure sensed by the pressure transducer 10.

The positive voltage signal across the capacitor 130 is supplied through an input resistor 138 to the inverting input of an operational amplifier 140. The non-inverting input of the amplifier 140 is connected through an input resistor 142 to the adjustable voltage output terminal of a potentiometer 144 connected between the positive voltage output of the regulated voltage supply 66 and ground. A feedback resistor 146 is connected in parallel with a capacitor 148 across the inverting input and the output of the amplifier 140.

The portion of the positive voltage signal across the capacitor 130 corresponding to the minimum pressure to be sensed by the pressure transducer 10 is removed, and the output signal of the amplifier 140 is made a positive voltage signal which is directly proportional to the sensed pressure, by setting the adjustable voltage output of the potentiometer 144 at a voltage level only slightly above the voltage level of the capacitor 130, corresponding to the minimum sensed pressure (in this case, 0 psig). The ohmic values of the feedback resistor 146 and the input resistor 138 are selected to determine the gain of the amplifier 140. The capacitor 148 is used to produce a smooth direct voltage output signal directly proportional to the sensed pressure, which can be supplied to one or more voltage-to-current signal converters 60, each driving the moving element of a DC ammeter 62, which is calibrated in units of pressure.

Where the pressure transducer 10 is connected so that the ratio of the voltage on tap 18 to the voltage on phase lead 20 is directly, rather than inversely, proportional to the sensed differential pressure, the circuit connections to the respective inverting and non-inverting inputs of the amplifier 140 are reversed, and the adjustable voltage output of the potentiometer 144 is set at a voltage level only slightly below the voltage level of the capacitor 130 corresponding to the minimum sensed pressure, so the output of the amplifier 140 will still be a positive voltage signal directly proportional to the sensed differential pressure.

As shown in FIG. 5, the direct voltage-to-direct current signal converter circuit 60 includes an operational amplifier 150, having a non-inverting input connected through an input resistor 152 to receive the positive voltage output signal from the amplifier 140. The output of the amplifier 150 is connected through a diode 154 to the base terminal of a high gain, monolithic, NPN Darlington amplifier 156. The collector terminal of the Darlington amplifier 156 is connected through the moving coil element of the permanent-magnet, moving-coil type DC ammeter 62 to the positive output of the unregulated direct voltage supply 64. The emitter terminal of the Darlington amplifier 156 is connected to ground through a resistor 160. The adjustable voltage output terminal of a potentiometer 162, connected across the resistor 160, is connected to the inverting input of the operational amplifier 150 to feed back a portion of the voltage developed across the resistor 160. The Darlington amplifier 156 should have a high forward current transfer ratio (as for example, the JEDEC type 2N5306 amplifier, which has a minimum forward current transfer ratio of 7,000) so that the current flowing through the resistor 160 will be substantially equal to the current flowing through the DC ammeter 62. The output of the potentiometer 162 can be adjusted to produce full scale deflection of the movable element in the DC ammeter 62 for a voltage signal input of the amplifier 150 corresponding to the maximum sensed pressure.

If desired, the single DC ammeter 62 shown in FIG. 5 can be replaced by a plurality of DC ammeters 62 connected in series, as shown in FIG. 6, to provide more than one DC ammeter 62, each indicating the pressure sensed by a single pressure transducer 10. However, since an open circuit in any one of these series-connected DC ammeters 62 will inactivate all of them, the preferred arangement for using a plurality of DC ammeters to indicate the same sensed pressure is that shown in FIG. 2 and discussed hereinbefore, in which each ammeter 62 is independently driven by a respective voltage-to-current signal converter 60.

The unregulated direct voltage supply 64 and the regulated direct voltage supply 66 consist of conventional well-known electronic components and circuits, and are thus not depicted or described in detail herein. For example, the unregulated direct voltage supply 64 can consist merely of two diodes reversely connected to the phase line of the unregulated AC supply to provide respective positive and negative half-wave DC output signals, which are filtered by respective filter capacitors connected between these diodes and ground. However, it should be noted that in such an unregulated direct voltage supply 64, the positive half-wave output signal must be sufficiently filtered so that the collector voltage of the Darlington amplifier 156 will follow the ripple of this positive signal. In such a case, the voltage drop across the ammeter 62 will remain constant to produce a flow of steady DC current therethrough. Similarly, known, monolithic, integrated circuit, voltage regulators can be used to provide the positive and negative constant voltage outputs of the regulated direct voltage supply 66.

The preferred embodiment described herein has been set out by way of example, not by way of limitation. For example, this invention can be used with any parameter-sensing transducer supplied with an electrical input signal, which produces an output signal wherein the ratio of the output signal to the input signal is proportional to the sensed parameter. Since numerous variants and other embodiments are readily apparent to those skilled in the art it is intended that the scope of the invention be limited only by the appended claims.

I claim:

1. Apparatus for producing a direct voltage ratio signal proportional to the ratio of a first direct voltage signal to a second direct voltage signal having a magnitude which is greater than the magnitude of the first direct voltage signal, which comprises:

a regulated direct voltage supply for providing a constant level, direct voltage signal;

first and second signal filtering means, each including a resistor-capacitor network and having an input and output, for filtering a pulsed, discontinuous, DC input signal to produce a continuous direct voltage output signal;

a signal comparator means;

a first switching means, actuated by said signal comparator means, for connecting said first signal filtering means to receive the constant level, direct voltage signal from said regulated direct voltage supply;

a second switching means, actuated by said signal comparator means, for connecting said second signal filtering means to receive the second direct voltage signal; and said signal comparator means having a first input connected to receive the first direct voltage signal and a second input connected to receive the output signal of said second signal filtering means, said signal comparator means simultaneously closing said first and second switching means whenever the output signal of said second signal filtering means falls below the first direct signal by a predetermined voltage increment, and simultaneously opening said first and second switching means whenever the output signal of said second filtering means rises above the first direct voltage signal by a predetermined voltage increment;

whereby the average magnitude of the output signal of said second filtering means is equal to the average magnitude of the first direct voltage signal, and the direct voltage output signal of said first signal filtering means constitutes the direct voltage ratio signal and is proportional to the ratio of the first direct voltage signal to the second direct voltage signal.

2. Measurement apparatus, as described in claim 1 which further comprises:

an alternating voltage supply;

a variable reluctance pressure transducer means, energized from said alternating voltage supply for producing an alternating voltage output signal whose magnitude, relative to the magnitude of the energizing alternating voltage, is proportional to a differential fluid pressure sensed by said transducer;

first signal rectifier means, for rectifying said transducer output signal to produce the first direct voltage signal; and second signal rectifier means, for rectifying the energizing alternating voltage to produce the second direct voltage signal;

whereby the direct voltage ratio signal is proportional to the differential fluid pressure sensed by said transducer.

3. Pressure measurement apparatus, as described in claim 2, which further comprises;

a DC power supply;

a DC ammeter, calibrated in units of pressure; and a voltage-to-current signal converter means, having an input connected to receive the direct voltage ratio signal and an output connected in series with said DC ammeter to said DC power supply, for converting the direct voltage ratio signal to a direct current signal proportional to the differential fluid pressure sensed by said transducer;

whereby said DC ammeter directly indicates the differential fluid pressure sensed by said transducer.

* * * * *